United States Patent
Uchibori

(10) Patent No.: US 10,391,971 B2
(45) Date of Patent: Aug. 27, 2019

(54) SEAT BELT RETRACTOR AND SEAT BELT APPARATUS PROVIDED WITH THE SAME

(71) Applicant: TAKATA CORPORATION, Tokyo (JP)

(72) Inventor: Hayato Uchibori, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 272 days.

(21) Appl. No.: 15/501,681

(22) PCT Filed: Jun. 5, 2015

(86) PCT No.: PCT/JP2015/066343
§ 371 (c)(1),
(2) Date: Feb. 3, 2017

(87) PCT Pub. No.: WO2016/021296
PCT Pub. Date: Feb. 11, 2016

(65) Prior Publication Data
US 2017/0225650 A1 Aug. 10, 2017

(30) Foreign Application Priority Data
Aug. 5, 2014 (JP) .................. 2014-159417

(51) Int. Cl.
*B60R 22/40* (2006.01)
*B60R 22/34* (2006.01)
(Continued)

(52) U.S. Cl.
CPC ............ *B60R 22/341* (2013.01); *B60R 22/40* (2013.01); *B60R 22/4676* (2013.01); *B60R 2022/287* (2013.01)

(58) Field of Classification Search
CPC .... B60R 22/40; B60R 22/341; B60R 22/4676
See application file for complete search history.

(56) References Cited

U.S. PATENT DOCUMENTS 8,905,439 B2 * 12/2014 Hiramatsu .......... B60R 22/4676
242/379.1
2011/0121120 A1 5/2011 Ogawa et al.
2014/0203620 A1 7/2014 Hiramatsu

FOREIGN PATENT DOCUMENTS

JP 2006-341711 A 12/2006
JP 2010-58655 A 3/2010
(Continued)

OTHER PUBLICATIONS

JPO; Japanese application No. 2014-159417; Notification of Reasons for Refusal dated Sep. 19, 2018.
(Continued)

*Primary Examiner* — Sang K Kim
(74) *Attorney, Agent, or Firm* — Fitch, Even, Tabin & Flannery LLP

(57) ABSTRACT

A seat belt retractor that has a simple structure, easy to manufacture and operates accurately is provided, and a seat belt apparatus provided with the seat belt retractor is also provided. The seat belt retractor includes energy absorbing mechanisms that absorb and alleviate the energy of a vehicle occupant by limiting a load applied to a seat belt. The energy absorbing mechanisms is coaxially incorporated in a spool, whose one end portion is retained by the spool and the other end can be locked by the lock mechanism, and obtains a rotational force when being twisted. The second energy absorbing mechanism includes a first rotating member rotatable together with the spool, an abutting member relatively rotatable with respect to the first rotating member by a predetermined angle, a second rotating member relatively rotatable with respect to the abutting member, and an energy absorbing member whose one end portion is fixed to and supported by the second rotating member and the other end portion abuts against the abutting member.

10 Claims, 10 Drawing Sheets

(51) Int. Cl.
*B60R 22/46* (2006.01)
*B60R 22/28* (2006.01)

(56) References Cited

FOREIGN PATENT DOCUMENTS

| | | |
|---|---|---|
| JP | 2010-58773 A | 3/2010 |
| JP | 2010-89652 A | 4/2010 |
| JP | 2010-100158 A | 5/2010 |
| JP | 2010-162933 A | 7/2010 |
| JP | 2011-105281 A | 6/2011 |
| JP | 2012-96745 A | 5/2012 |
| JP | 2013-35444 A | 2/2013 |
| JP | 2013-49401 A | 3/2013 |
| JP | 2013-60135 A | 4/2013 |
| WO | 2012/165408 A1 | 12/2012 |

OTHER PUBLICATIONS

International Search Report dated Jun. 30, 2015 for PCT/JP2015/066343 and English translation of the same. (3 pages).

* cited by examiner

SEAT BELT RETRACTOR AND SEAT BELT APPARATUS PROVIDED WITH THE SAME

This application is a U.S. National Phase Patent Application of International Patent Application Number PCT/JP2015/066343, filed on Jun. 5, 2015, which claims priority of Japanese Patent Application Number 2014-159417, filed Aug. 5, 2014, which are hereby incorporated herein by reference in their entirety.

TECHNICAL FIELD

The present invention relates to the technical field of a seat belt retractor that winds a seat belt in a withdrawable manner and, more particularly, to the technical field of a seat belt retractor provided with an energy absorbing mechanism that absorbs and alleviates the energy of an occupant by limiting a load applied to a seat belt by an action of an energy absorbing member, such as twisting of a torsion bar, when preventing withdrawal of the seat belt in case of an emergency where, for example, a large deceleration acts on the vehicle at the time of collision when the seat belt is fastened, and a seat belt apparatus provided with the same.

BACKGROUND ART

It is known that a seat belt apparatus installed in a vehicle such as an automobile restrains an occupant by a seat belt in case of such an emergency as described above to prevent the occupant from jumping out of a seat.

Such a seat belt apparatus is provided with a seat belt retractor that winds a seat belt. In the seat belt retractor, the seat belt is wound around a spool when not worn. When the seat belt is to be worn, the seat belt is withdrawn and is fastened around an occupant. In case of the emergency mentioned above, a locking mechanism included in the seat belt retractor is actuated to lock the rotation of the spool in a seat belt withdrawal direction, whereby the withdrawal of the seat belt is prevented. Thus, the occupant is restrained by the seat belt in case of an emergency.

In the above known seat belt retractor of the seat belt apparatus, when the seat belt restrains the occupant in case of emergency, such as a vehicle collision, a rapid vehicle deceleration occurs to cause the occupant to move forward due to a large inertia.

Accordingly, a large load is applied to the seat belt and a large energy is applied to the occupant from the seat belt. The energy is not particularly a problem to the occupant but, if possible, it is desirable that the energy is restricted.

Accordingly, conventionally, a seat belt retractor has been developed that is provided with a torsion bar so that, in a state where the seat belt is worn in an emergency situation, energy is absorbed and alleviated with the load acting on the seat belt restricted.

However, in conventional seat belt retractors, only a single limit load is set for the limit load after the collision. In actuality, the energy applied to the occupant differs in various manners depending on the weight and the like of the occupant. Rather than responding to such different kinds of large energies with a single limit load, by setting limit loads according to the circumstances of the vehicle in an emergency, the occupant can be restrained in a more effective and adequate manner.

To meet the above requirement, there is proposed a seat belt retractor provided with first and second energy absorbing mechanisms so as to be able to change the limit load applied to the seat belt by setting one or two limit loads according to the circumstances of an emergency (see, for example, Patent Document 1).

CITATION LIST

Patent Document

Patent Document 1: JP 2012-96745A

However, the seat belt retractor described in Patent Document 1 has a complicate structure and thus has a large number of components, which may lead to an increase in cost and elongation of a manufacturing period.

The present invention has been made in view of the above situation, and the object thereof is to provide a seat belt retractor that has a simple structure, easy to manufacture and operates accurately, and a seat belt apparatus provided with the seat belt retractor.

To solve the above problem, a seat belt retractor according to the present invention includes: a frame; a seat belt; a spool that is rotatably supported by the frame and winds the seat belt; a lock mechanism that allows a rotation of the spool when the seat belt retractor is in a non-operating state and prevents a rotation of the spool in a seat withdrawal direction when the seat belt retractor is in an operating state; and an energy absorbing mechanism that absorbs and alleviates the energy of a vehicle occupant by limiting a load applied to the seat belt. The energy absorbing mechanism includes: a first energy absorbing mechanism that is coaxially incorporated in the spool, whose one end portion is retained by the spool and the other end can be locked by the lock mechanism, and obtains a rotational force when being twisted; and a second energy absorbing mechanism that includes: a first rotating member rotatable together with the spool; an abutting member relatively rotatable with respect to the first rotating member by a predetermined angle; a second rotating member relatively rotatable with respect to the abutting member; and an energy absorbing member whose one end portion is fixed to and supported by the second rotating member and the other end portion abuts against the abutting member.

Further, in the seat belt retractor according to the present invention, the second rotating member and the abutting member can be relatively rotated by absorbing power of the energy absorbing member.

Further, in the seat belt retractor according to the present invention, the first rotating member has an engaging part, the abutting member has an engaged part engaged with the engaging part, and the engaging part and the engaged part can be relatively moved in a circumferential direction by the predetermined angle.

Further, in the seat belt retractor according to the present invention, the engaging part has a projection, the engaged part has a cut part in which the projecting is fitted, and first and second wall parts formed at opposite end portions of the cut part, and the first rotating member and abutting member are assembled so as to be relatively rotatable by an angular range within which the projection is moved in the cut part.

Further, the seat belt retractor according to the present invention includes: a frame; a seat belt; a spool that is rotatably supported by the frame and winds the seat belt; a lock mechanism that allows a rotation of the spool when the seat belt retractor is in a non-operating state and prevents a rotation of the spool in a seat withdrawal direction when the seat belt retractor is in an operating state; and an energy absorbing mechanism that absorbs and alleviates the energy of a vehicle occupant by limiting a load applied to the seat belt. The energy absorbing mechanism includes: a first energy absorbing mechanism that is coaxially incorporated in the spool, whose one end portion is retained by the spool and the other end can be locked by the lock mechanism, and obtains a rotational force when being twisted; and a second energy absorbing mechanism that includes: a first rotating member rotatable together with the spool; an abutting member relatively rotatable with respect to the first rotating member; a second rotating member relatively rotatable with respect to the abutting member by a predetermined angle; and an energy absorbing member whose one end portion is fixed to and supported by the first rotating member and the other end portion abuts against the abutting member.

Further, in the seat belt retractor according to the present invention, the first rotating member and the abutting member can be relatively rotated by absorbing power of the energy absorbing member.

Further, in the seat belt retractor according to the present invention, the second rotating member has an engaging part, the abutting member has an engaged part engaged with the engaging part, and the engaging part and the engaged part can be relatively moved in a circumferential direction by the predetermined angle.

Further, in the seat belt retractor according to the present invention, the engaging part has a projection, the engaged part has a cut part in which the projecting is fitted, and first and second wall parts formed at opposite end portions of the cut part, and the first rotating member and abutting member are assembled so as to be relatively rotatable by an angular range within which the projection is moved in the cut part.

Further, in the seat belt retractor according to the present invention, in a case where the projection abuts against the first wall part and where the projection is being moved between the first and second wall parts, only the first energy absorbing mechanism is operated, and in a case where the projection abuts against the second wall part, both the first and second energy absorbing mechanisms are operated.

Further, in the seat belt retractor according to the present invention, the energy absorbing member is formed of an elongated belt-like energy absorbing plate.

Further, in the seat belt retractor according to the present invention, the first energy absorbing mechanism is a torsion bar provided between the spool and the lock mechanism.

Further, in the seat belt retractor according to the present invention, the first rotating member is a tubular part integrally formed with the spool at one end side thereof.

Further, in the seat belt retractor according to the present invention, the abutting member is relatively rotatably provided in the inner periphery of the tubular part.

A seat belt apparatus according to the present invention includes at least: the seat belt retractor that winds a seat belt; a tongue that is slidably supported by the seat belt withdrawn from the seat belt retractor; and a buckle with which the tongue is disengageably engaged. Withdrawal of the seat belt is prevented by the seat belt retractor in an emergency to thereby restrain a vehicle occupant with the seat belt.

The seat belt apparatus according to the present invention further includes a pretensioner that is operated in an emergency to rotate the spool directly in a seat belt winding direction.

A seat belt retractor according to the present invention having the above structure includes: a frame; a seat belt; a spool that is rotatably supported by the frame and winds the seat belt; a lock mechanism that allows a rotation of the spool when the seat belt retractor is in a non-operating state and prevents a rotation of the spool in a seat withdrawal direction when the seat belt retractor is in an operating state; and an energy absorbing mechanism that absorbs and alleviates the energy of a vehicle occupant by limiting a load applied to the seat belt. The energy absorbing mechanism includes: a first energy absorbing mechanism that is coaxially incorporated in the spool, whose one end portion is retained by the spool and the other end can be locked by the lock mechanism, and obtains a rotational force when being twisted; and a second energy absorbing mechanism that includes: a first rotating member rotatable together with the spool; an abutting member relatively rotatable with respect to the first rotating member by a predetermined angle; a second rotating member relatively rotatable with respect to the abutting member; and an energy absorbing member whose one end portion is fixed to and supported by the second rotating member and the other end portion abuts against the abutting member. Thus, there can be provided a seat belt retractor that has a simple structure, easy to manufacture and operates accurately.

Further, in the seat belt retractor according to the present invention, the second rotating member and the abutting member can be relatively rotated by absorbing power of the energy absorbing member, thus allowing adequate energy absorption.

Further, in the seat belt retractor according to the present invention, the first rotating member has an engaging part, the abutting member has an engaged part engaged with the engaging part, and the engaging part and the engaged part can be relatively moved in a circumferential direction by the predetermined angle, thus allowing appropriate relative movement of the first rotating member and abutting member.

Further, in the seat belt retractor according to the present invention, the engaging part has a projection, the engaged part has a cut part in which the projecting is fitted, and first and second wall parts formed at opposite end portions of the cut part, and the first rotating member and the abutting member are assembled so as to be relatively rotatable by an angular range within which the projection is moved in the cut part, thus allowing appropriate relative rotation between the first rotating member and the abutting member.

Further, the seat belt retractor according to the present invention includes: a frame; a seat belt; a spool that is rotatably supported by the frame and winds the seat belt; a lock mechanism that allows a rotation of the spool when the seat belt retractor is in a non-operating state and prevents a rotation of the spool in a seat withdrawal direction when the seat belt retractor is in an operating state; and an energy absorbing mechanism that absorbs and alleviates the energy of a vehicle occupant by limiting a load applied to the seat belt. The energy absorbing mechanism includes: a first energy absorbing mechanism that is coaxially incorporated in the spool, whose one end portion is retained by the spool and the other end can be locked by the lock mechanism, and obtains a rotational force when being twisted; and a second energy absorbing mechanism that includes: a first rotating member rotatable together with the spool; an abutting member relatively rotatable with respect to the first rotating member; a second rotating member relatively rotatable with respect to the abutting member by a predetermined angle; and an energy absorbing member whose one end portion is fixed to and supported by the first rotating member and the other end portion abuts against the abutting member. Thus, there can be provided a seat belt retractor that has a simple structure, easy to manufacture and operates accurately.

Further, in the seat belt retractor according to the present invention, the first rotating member and the abutting member can be relatively rotated by absorbing power of the energy absorbing member, thus allowing adequate energy absorption.

Further, in the seat belt retractor according to the present invention, the second rotating member has an engaging part, the abutting member has an engaged part engaged with the engaging part, and the engaging part and the engaged part can be relatively moved in a circumferential direction by the predetermined angle, thus allowing appropriate relative movement of the second rotating member and the abutting member.

Further, in the seat belt retractor according to the present invention, the engaging part has a projection, the engaged part has a cut part in which the projecting is fitted, and first and second wall parts formed at opposite end portions of the cut part, and the first rotating member and the abutting member are assembled so as to be relatively rotatable by an angular range within which the projection is moved in the cut part, thus allowing appropriate relative rotation between the first rotating member and the abutting member.

Further, in the seat belt retractor according to the present invention, in a case where the projection abuts against the first wall part and where the projection is being moved between the first and second wall parts, only the first energy absorbing mechanism is operated, and in a case where the projection abuts against the second wall part, both the first and second energy absorbing mechanisms are operated. Thus, a simple and easily-manufactured structure and appropriate operation can be achieved.

Further, in the seat belt retractor according to the present invention, the energy absorbing member is formed of an elongated belt-like energy absorbing plate, thus achieving a simple structure and easy assembly.

Further, in the seat belt retractor according to the present invention, the first energy absorbing mechanism is a torsion bar provided between the spool and the lock mechanism, thus achieving a simple structure and easy assembly.

Further, in the seat belt retractor according to the present invention, the first rotating member is a tubular part integrally formed with the spool at one end side thereof, thus achieving a simple structure and easy assembly.

Further, in the seat belt retractor according to the present invention, the abutting member is relatively rotatably provided in the inner periphery of the tubular part, thus achieving a compact structure.

A seat belt apparatus according to the present invention includes at least: the seat belt retractor that winds a seat belt; a tongue that is slidably supported by the seat belt withdrawn from the seat belt retractor; and a buckle with which the tongue is disengageably engaged. Withdrawal of the seat belt is prevented by the seat belt retractor in an emergency to thereby restrain a vehicle occupant with the seat belt. Thus, a simple and easily-manufactured structure and appropriate operation can be achieved.

The seat belt apparatus according to the present invention further includes a pretensioner that is operated in an emergency to rotate the spool directly in a seat belt winding direction. Thus, even when the first and second energy absorbing mechanisms are provided, the pretensioner can demonstrate an effective seat belt winding performance in emergency situations by directly rotating the spool in the seat belt winding direction.

DETAILED DESCRIPTION OF THE PREFERRED EMBODIMENTS

An embodiment for practicing the present invention will be described using the drawings.

Figure 1:
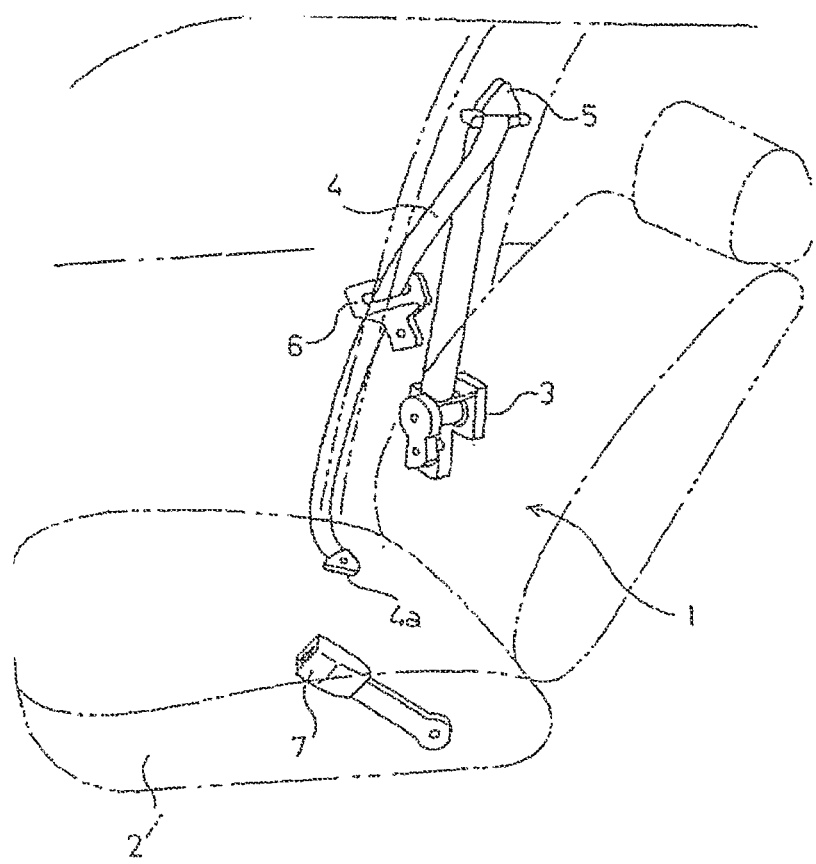
FIG. 1 is a perspective view schematically illustrating a seat belt apparatus provided with a seat belt retractor according to an embodiment of the present invention.

FIG. 1 is a view schematically illustrating a seat belt apparatus provided with a seat belt retractor according to an embodiment of the present invention.

As illustrated in FIG. 1, a seat belt apparatus 1 of the embodiment has, like a conventionally known three-point seat belt apparatus using a seat belt retractor, a seat belt retractor 3 fixed to a vehicle body near a vehicle seat 2, a seat belt 4 that is withdrawn from the seat belt retractor 3 and has a belt anchor 4a provided at the leading end thereof and fixed to the floor of the vehicle body or to the vehicle seat 2, a guide anchor 5 that guides, toward a shoulder of an occupant, the seat belt 4 that has been withdrawn from the seat belt retractor 3, a tongue 6 that is slidably supported by the seat belt 4 that has been guided from the guide anchor 5, and a buckle 7 that is fixed to the floor of the vehicle body or to the vehicle seat 2 and disengageably engaged with the tongue 6 that is to be inserted thereinto.

Figure 2:
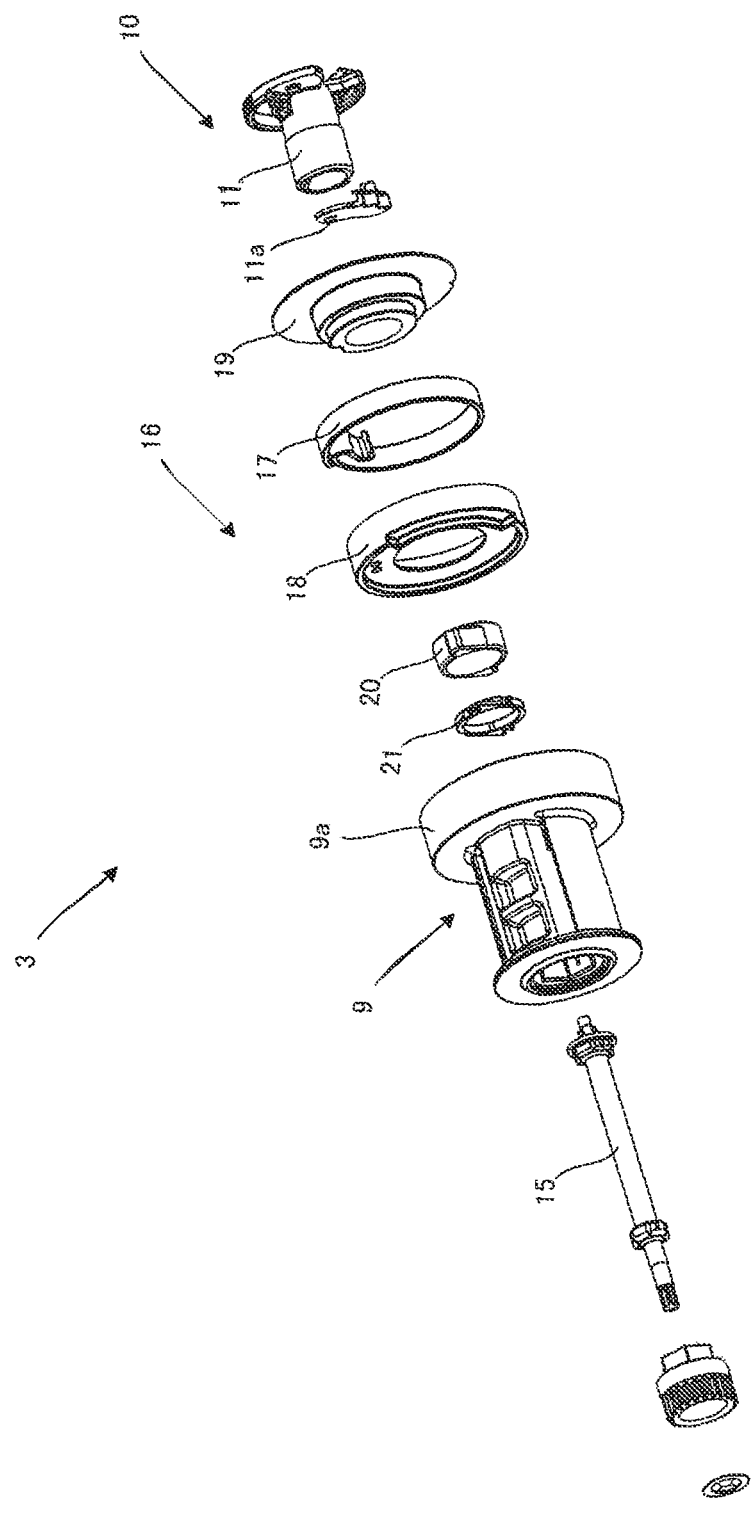
FIG. 2 is an exploded perspective view illustrating the seat belt retractor according to the present embodiment.
Figure 3:
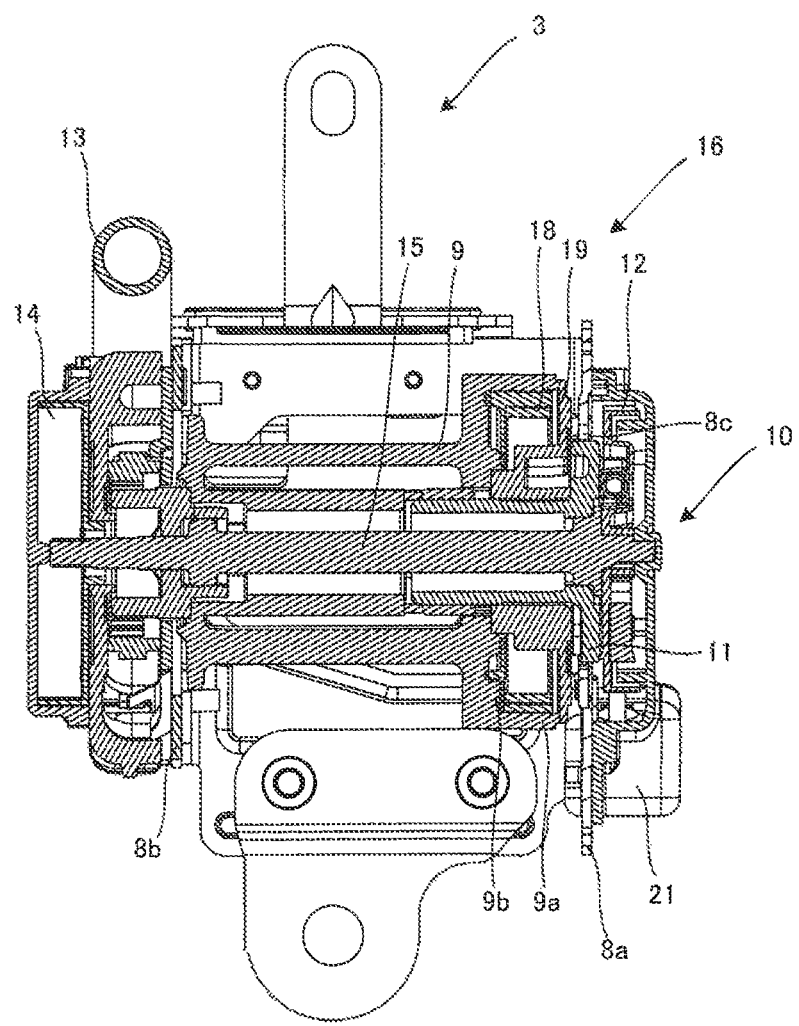
FIG. 3 is a vertical cross-sectional view illustrating the seat belt retractor according to the present embodiment.

FIG. 2 is an exploded perspective view illustrating the seat belt retractor according to the present embodiment. FIG. 3 is a vertical cross-sectional view illustrating the seat belt retractor according to the present embodiment.

As illustrated in FIG. 3, like an emergency-locking seat belt retractor (ELR) described in the above Patent Document 1, the seat belt retractor 3 according to the present embodiment has a U-shaped frame 8. The frame 8 rotatably supports a spool 9 that winds the seat belt 4. A lock mechanism 10 is provided on one side wall (right wall in FIG. 3) of the frame 8. A pretensioner 13 and a spring mechanism 14 are provided on the other side wall (left wall in FIG. 3) of the frame 8. A torsion bar (first energy absorbing mechanism) 15 is provided between the spool 9 and the lock mechanism 10 and, further, a second energy absorbing mechanism 16 is provided therebetween. A stopper 20 is a member for restricting the rotation of a locking base 11, and a spacer 21 is a member for stabilizing the rotation of the spool 9 and the locking base 11.

A basic operation of the seat belt retractor 3 according to the present embodiment is as follows. That is, a deceleration sensing mechanism 21 of a vehicle sensor is operated in an emergency to lock the rotation of a lock gear 12 of the lock mechanism 10 in a seat belt withdrawal direction. Then, a relative rotation occurs between the locking base 11 and the lock gear 12, so that a pawl 11a provided in the locking base 11 is rotated to be locked to an internal tooth 8c (see FIG. 3) provided on a side wall 8a of the frame 8, whereby the rotation of the locking base 11 is stopped, with the result that the rotation of the spool 9 in the seat belt withdrawal direction is locked. Even when the seat belt is abruptly withdrawn, the rotation of the lock gear 12 in the seat belt withdrawal direction is locked by an unillustrated webbing sensor, with the result that the rotation of the spool 9 in the seat belt withdrawal direction is locked similarly. A concrete operation of the seat belt retractor 3 will be described later.

Figure 4:
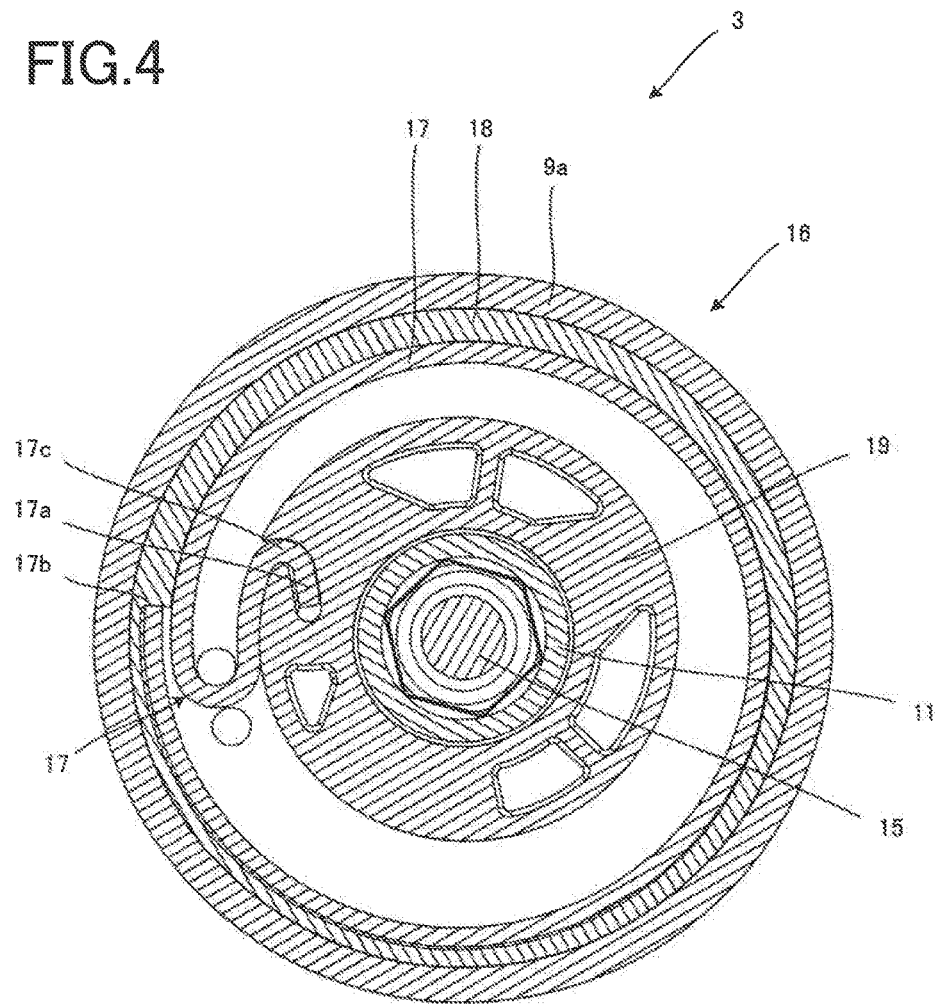
FIG. 4 is a cross-sectional view illustrating a second energy absorbing mechanism according to the present embodiment.

FIG. 4 is a cross-sectional view illustrating the second energy absorbing mechanism according to the present embodiment.

As illustrated in FIGS. 3 and 4, the second energy absorbing mechanism 16 according to the present embodiment has an energy absorbing plate (EA plate) 17 as an energy absorbing member, an energy absorbing plate operating member 18 serving as an annular abutting member provided in the inner periphery of a tubular part 9a as a first rotating member positioned at one end side (right end side in FIG. 3) of the spool 9, and an energy absorbing plate support member 19 as a second rotating member that is rotated integrally with the locking base 11, relatively rotatably provided on the energy absorbing plate operating member 18, and supports a first supported part 17a of the energy absorbing plate 17.

The energy absorbing plate 17 is formed of an elongated belt-like plate having a predetermined thickness and a predetermined width and having elasticity. The energy absorbing plate 17 is formed into an irregular S-shape as a whole. Alternatively, the energy absorbing plate 17 may be formed of a linear member. One end portion of the energy absorbing plate 17 is formed as a first supported part 17a fixed to and supported by the energy absorbing plate support member 19, and the other end portion 17b thereof can be made to abut against the energy absorbing plate operating member 18 in a seat belt winding direction (clockwise direction in FIG. 4). The energy absorbing plate 17 has, in the vicinity of the first supported part 17a, a U-shaped part 17c obtained by folding the other end portion thereof. A part of the energy absorbing plate 17 that is closer to the other end portion 17b normally contacts the inner peripheral surface of the energy absorbing plate operating member 18.

Figure 5:
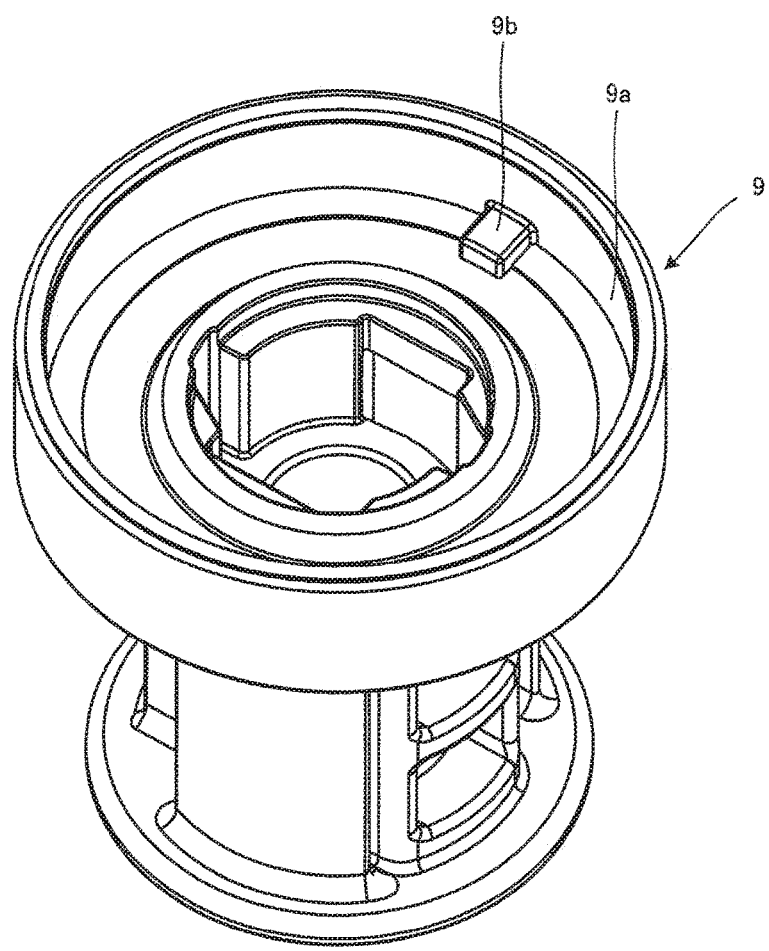
FIG. 5 is a perspective view illustrating a tubular part of a spool according to the present embodiment.
Figure 6:
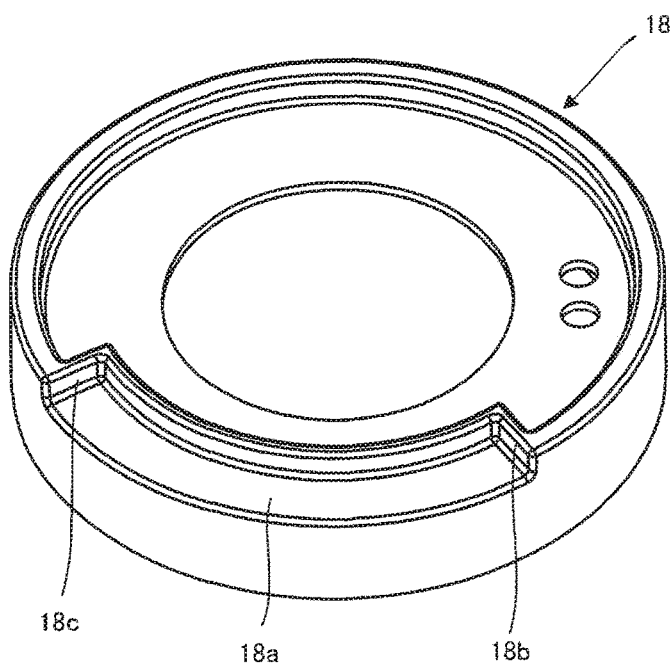
FIG. 6 is a perspective view illustrating an energy absorbing plate operating member according to the present embodiment.

FIG. 5 is a perspective view illustrating the tubular part 9a of the spool 9 according to the present embodiment. FIG. 6 is a perspective view illustrating the energy absorbing plate operating member 18 according to the present embodiment.

As illustrated in FIG. 5, a projection 9b as an engaging part is formed so as to protrude from the inner peripheral surface of the tubular part 9a of the spool 9. Correspondingly, as illustrated in FIG. 6, a cut part 18a as an engaged part in which the projection 9b of the spool 9 is fitted is formed in the energy absorbing plate operating member 18. A first wall part 18b is formed at an end portion of the cut part 18a in the counterclockwise direction, and a second wall part 18c is formed at an end portion of the cut part 18a in the clockwise direction.

As illustrated in FIG. 3, the energy absorbing plate operating member 18 is coaxially fitted to the inner peripheral surface of the tubular part 9a of the spool 9 so as to be relatively rotatable. The spool 9 and the energy absorbing plate operating member 18 are assembled so as to be relatively rotatable by an angular range within which the projection 9b is moved between the first wall part 18b and the second wall part 18c along the cut part 18a.

The following describes operation of the thus configured seat belt retractor 3 according to the present embodiment. Particularly, operation of unique portions of the seat belt retractor 3 of the present embodiment will be described.

Figure 7:
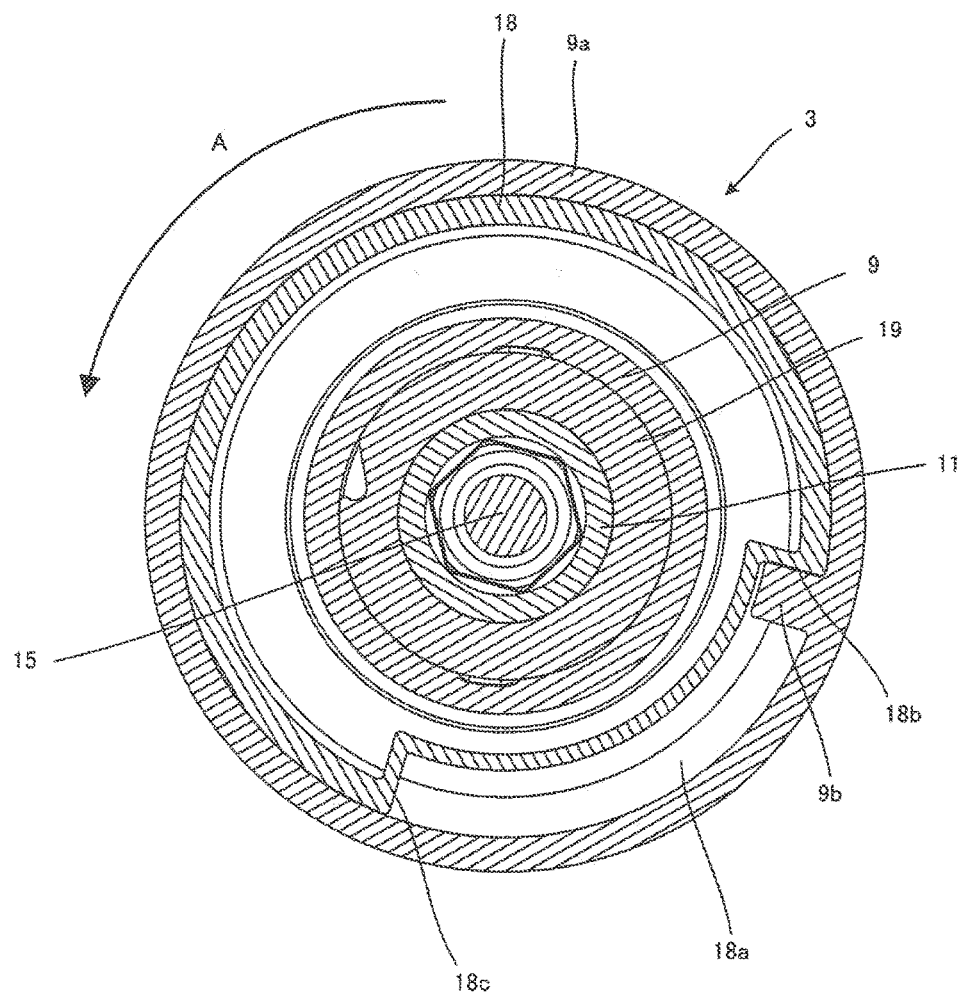
FIG. 7 illustrates the relationship between the spool and an energy absorbing plate operating member 18 in a normal state.

FIG. 7 illustrates the relationship between the spool 9 and the energy absorbing plate operating member 18 in a normal state.

In a normally worn state of the seat belt 4, in the seat belt retractor 3, the energy absorbing plate 17 is retained in a non-operating state as illustrated in FIG. 4, and the projection 9b of the spool 9 is retained in a state of contacting the first wall part 18b of the energy absorbing plate operating member 18 as illustrated in FIG. 7.

When the spool 9 is rotated in the normal state, the torsion bar 15, locking base 11, energy absorbing plate support member 19, energy absorbing plate 17, and the energy absorbing plate operating member 18 are rotated integrally.

When a deceleration much larger than that during a normal traveling time occurs in the vehicle in the aforementioned emergency situation, the pretensioner 13 illustrated in FIG. 3 is actuated. The operation of the pretensioner 13 brings the spool 9 into a state ready for a rotational motion directly in a seat belt winding direction A without intervention of the torsion bar 15 as illustrated in FIG. 7. At this state, the spool 9, locking base 11, energy absorbing plate support member 19, energy absorbing plate 17, and the energy absorbing plate operating member 18 start rotating integrally in the seat belt winding direction A. As a result, looseness of the seat belt 4 worn by an occupant is eliminated to restrain him or her. Further, the energy absorbing plate 17 is retained in its initial state.

After completion of the seat belt winding caused by the operation of the pretensioner 13, inertia of the occupant is applied to the seat belt 4 intending for withdrawal. In this state, the pawl 11a of the locking base 11 illustrated in FIGS. 2 and 3 is rotated to be locked to the internal tooth 8c provided on the side wall 8a of the frame 8, whereby the rotation of the locking base 11 in a seat belt withdrawal direction B is prevented. However, at this time, the spool 9 is about to be rotated in the seat belt withdrawal direction B, so that the torsion bar 15 is twisted and deformed in the conventional way owing to the rotation of the spool 9 in the seat belt withdrawal direction B and prevention of the rotation of the locking base 11. That is, as a first energy absorbing stage, the torsion bar 15 is actuated, and the inertia energy of the occupant is absorbed by the torsion bar 15.

Figure 8:
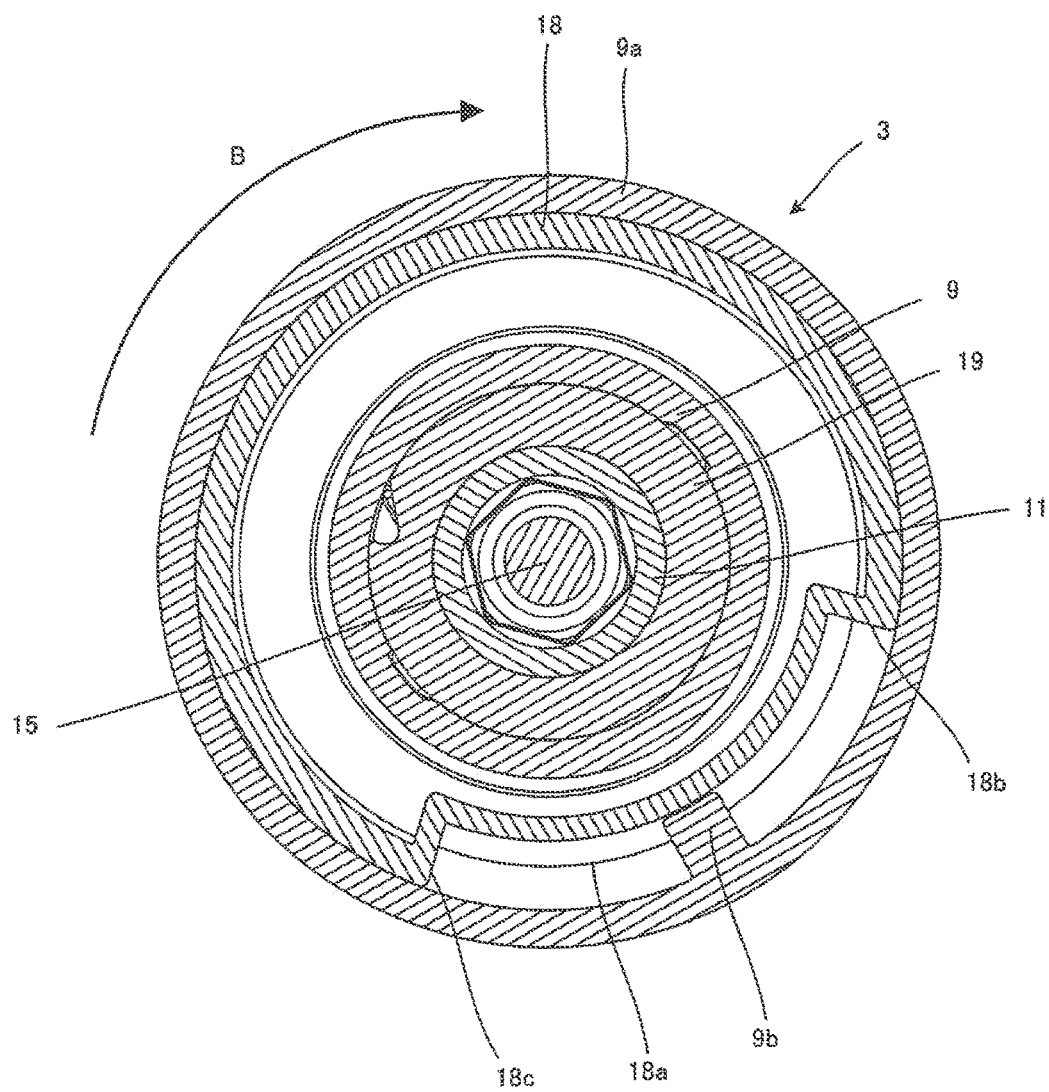
FIG. 8 illustrates the relationship between the spool and the energy absorbing plate operating member in a first energy absorbing stage.

FIG. 8 illustrates the relationship between the spool 9 and the energy absorbing plate operating member 18 in the first energy absorbing stage.

At this state, as illustrated in FIG. 8, the projection 9b of the spool 9 is rotated in the seat belt withdrawal direction B. However, the projection 9b is only moved in the cut part 18a, which does not allow the energy absorbing plate operating member 18 to make a rotation. Therefore, the energy absorbing plate 17 is retained in its initial state.

That is, in the first energy absorbing stage, the inertia energy of the occupant is absorbed only by the torsion bar 15.

Figure 9:
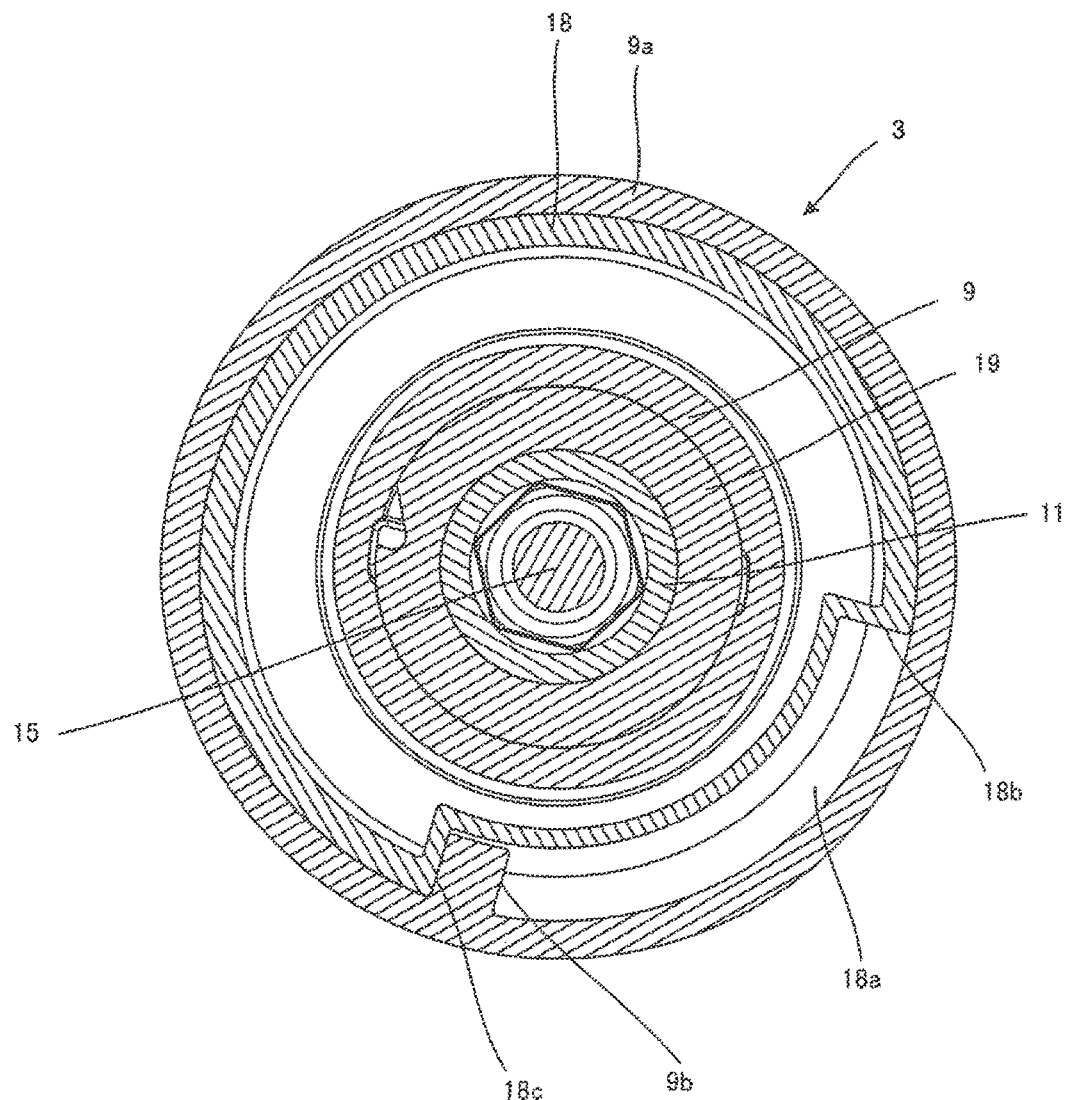
FIG. 9 illustrates the relationship between the spool and the energy absorbing plate operating member in a second energy absorbing stage.

FIG. 9 illustrates the relationship between the spool 9 and energy absorbing plate operating member 18 in the second energy absorbing stage.

Thereafter, at the second energy absorbing stage in which the spool 9 further rotates in the seat belt withdrawal direction B, the projection 9b of the spool 9 abuts against the second wall part 18c of the energy absorbing plate operating member 18 as illustrated in FIG. 9, causing the spool 9 and energy absorbing plate operating member 18 to rotate integrally. At this state, the pawl 11a of the locking base 11 is rotated to be locked to the internal tooth 8c provided on the side wall 8a of the frame 8, whereby the rotation of the locking base 11 in the seat belt withdrawal direction B is prevented, with the result that the rotation of the energy absorbing plate support member 19 is also prevented.

Then, the energy absorbing plate 17 illustrated in FIG. 4 is gradually deformed due to the rotation of the spool 9 and the energy absorbing plate operating member 18 in the seat belt withdrawal direction B and prevention of the rotation of the locking base 11 and the energy absorbing plate support member 19. As a result, energy applied to the occupant is absorbed by the second energy absorbing mechanism 16 as well.

It follows that a limit load (EA load) has a value obtained by adding a load by the twisting deformation of the torsion bar 15 and a load by the deformation of the energy absorbing plate 17. Thus, an energy applied to the occupant is absorbed more effectively by the deformation of both the torsion bar 15 and the energy absorbing plate 17 of the second energy absorbing mechanism 16.

Figure 10:
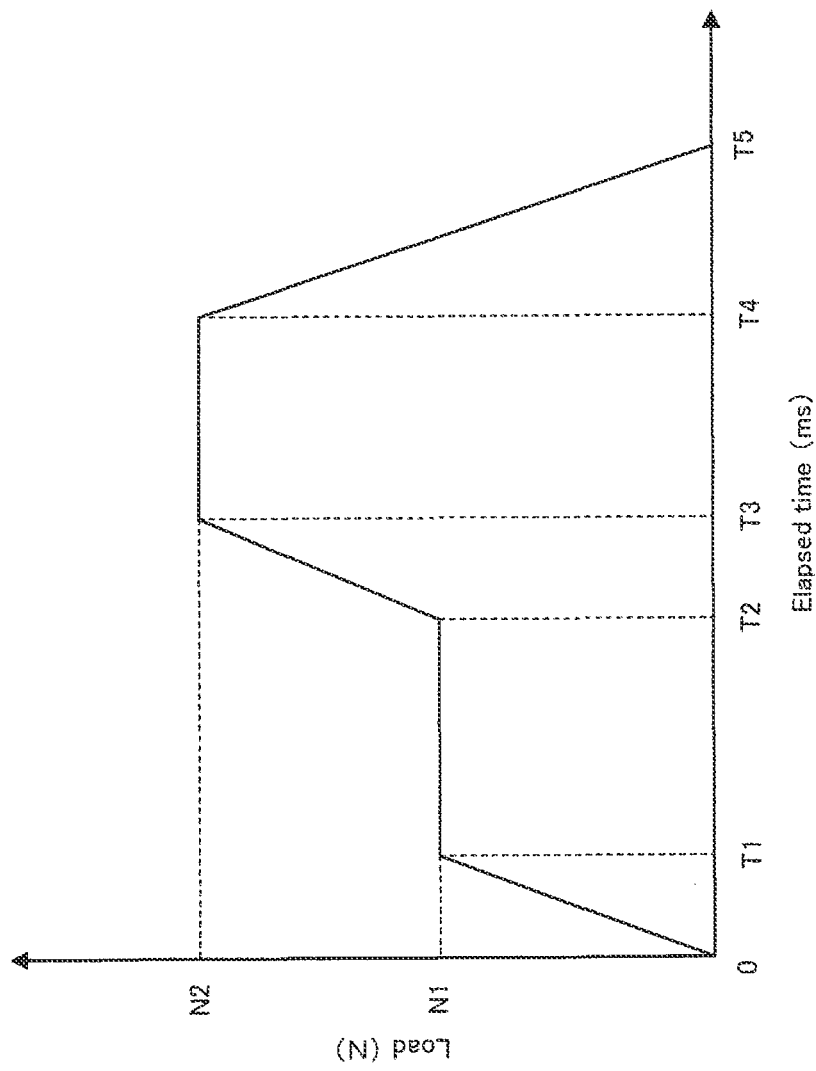
FIG. 10 illustrates the relationship between an elapsed time after actuation of the energy absorbing mechanism according to the present embodiment and a load.

FIG. 10 illustrates the relationship between an elapsed time after actuation of the energy absorbing mechanism according to the present embodiment and a load.

As illustrated in FIG. 10, after the energy absorbing mechanism is actuated, in the seat belt retractor 3 according to the present embodiment, a load by the torsion bar 15 is gradually increased up to a first time point T1. In this state, the spool 9 and the energy absorbing plate operating member 18 are in the positional relationship illustrated in FIG. 7.

Thereafter, during a time period between the first time point T1 and a second time point T2, only a fixed load N1 by the torsion bar 15 is applied. In this state, the spool 9 and the energy absorbing plate operating member 18 are in the positional relationship illustrated in FIG. 8.

Subsequently, during a time period between the second time point T2 and a third time point T3, a load by the energy absorbing plate 17 is added to the fixed load by the torsion bar 15, whereby the total load is gradually increased. In this state, the spool 9 and the energy absorbing plate operating member 18 are in the positional relationship illustrated in FIG. 8.

Thereafter, during a time period between the third time point T3 and a fourth time point T4, only a fixed load N2 by the torsion bar 15 and the energy absorbing plate 17 is applied. Finally, the load is gradually decreased during a time period between the fourth time point T4 and a fifth time point T5.

Thus, when the occupant is small in physical size, a moving distance of the occupant in an emergency is small, and thus a load applied to the seat belt is small. Thus, in this case, a configuration is possible, in which only the load N1 by the twisting deformation of the torsion bar 15 is applied, followed by a decrease in the load. On the other hand, when the occupant is large in physical size, a moving distance of the occupant in an emergency is large, and thus a load applied to the seat belt is large. Thus, in this case, the fixed load by the energy absorbing plate 17 is added to the load N1 by the torsion bar 15, and the load N2 which is the sum of the load by the torsion bar 15 and the load by the energy absorbing plate 17 is applied.

As described above, the seat belt retractor 3 according to the present embodiment can restrain the occupant at the time of vehicle collision effectively, adequately, and at low cost according to the physical size of the occupant without using a sensor or a drive member.

Further, a control of the length of the cut part 18a allows a time between the first and second energy absorbing stages to be adjusted. For example, when the distance between the first wall part 18b and the second wall part 18c is increased, a time length during which the load applied only by the torsion bar 15 is increased.

The thus configured seat belt retractor according to the present embodiment includes the frame 8, the seat belt 4, the spool 9 that is rotatably supported by the frame 8 and winds the seat belt 4, the lock mechanism 10 that allows a rotation of the spool 9 when the seat belt retractor 3 is in a non-operating state and prevents a rotation of the spool 9 in a withdrawal direction of the seat belt 4 when the seat belt retractor 3 is in an operating state, and the energy absorbing mechanisms 15 and 16 that absorb and alleviate the energy of a vehicle occupant by limiting a load applied to the seat belt 4. The energy absorbing mechanisms 15 is a first energy absorbing mechanism that is coaxially incorporated in the spool 9, whose one end portion is retained by the spool 9 and the other end can be locked by the lock mechanism 10, and obtains a rotational force when being twisted. The second energy absorbing mechanism 16 is a second energy absorbing mechanism that includes the first rotating member 9a rotatable together with the spool 9, the energy absorbing plate operating member 18 relatively rotatable with respect to the first rotating member 9a by a predetermined angle, the energy absorbing plate support member 19 relatively rotatable with respect to the energy absorbing plate operating member 18, and the energy absorbing plate 17 whose one end portion is fixed to and supported by the energy absorbing plate support member 19 and the other end portion abuts against the energy absorbing plate operating member 18. Thus, there can be provided a seat belt retractor that has a simple structure, easy to manufacture and operates accurately.

Further, in the seat belt retractor 3 according to the present embodiment, the energy absorbing plate support member 19 and the energy absorbing plate operating member 18 can be relatively rotated by absorbing power of the energy absorbing plate 17, thus allowing adequate energy absorption.

Further, in the seat belt retractor 3 according to the present embodiment, the first rotating member 9a has an engaging part 9b, the energy absorbing plate operating member 18 has engaged parts 18a, 18b, and 18c engaged with the engaging part 9b, and the engaging part 9b and the engaged parts 18a, 18b, and 18c can be relatively moved in a circumferential direction by a predetermined angle, thus allowing appropriate relative movement of the first rotating member 9a and the energy absorbing plate operating member 18.

Further, in the seat belt retractor 3 according to the present embodiment, the engaging part 9b is the projection 9b, the engaged part 18a is the cut part 18a in which the projection 9b is fitted, the engaged parts 18b and 18c are the first and second wall parts 18b and 18c, respectively, formed at opposite end portions of the cut part 18a, and the first rotating member 9a and energy absorbing plate operating member 18 are assembled so as to be relatively rotatable by an angular range within which the projection 9b is moved in the cut part 18a, thus allowing appropriate relative rotation between the first rotating member 9a and the energy absorbing plate operating member 18.

Further, the seat belt retractor 3 according to the present embodiment includes the frame 8, the seat belt 4, the spool 9 that is rotatably supported by the frame 8 and winds the seat belt 4, the lock mechanism 10 that allows a rotation of the spool 9 when the seat belt retractor 3 is in a non-operating state and prevents a rotation of the spool 9 in a withdrawal direction of the seat belt 4 when the seat belt retractor 3 is in an operating state, and the energy absorbing mechanisms 15 and 16 that absorb and alleviate the energy of a vehicle occupant by limiting a load applied to the seat belt 4. The energy absorbing mechanisms 15 is a first energy absorbing mechanism that is coaxially incorporated in the spool 9, whose one end portion is retained by the spool 9 and the other end can be locked by the lock mechanism 10, and obtains a rotational force when being twisted. The second energy absorbing mechanism 16 is a second energy absorbing mechanism that includes the first rotating member 9a rotatable together with the spool 9, the energy absorbing plate operating member 18 relatively rotatable with respect to the first rotating member 9a, the energy absorbing plate support member 19 relatively rotatable with respect to the energy absorbing plate operating member 18 by a predetermined angle, and the energy absorbing plate 17 whose one end portion is fixed to and supported by first rotating member 9a and the other end portion abuts against the energy absorbing plate operating member 18. Thus, there can be provided a seat belt retractor 3 that has a simple structure, easy to manufacture and operates accurately.

Further, in the seat belt retractor 3 according to the present embodiment, the first rotating member 9a and energy absorbing plate operating member 18 can be relatively rotated by absorbing power of the energy absorbing plate 17, thus allowing adequate energy absorption.

Further, in the seat belt retractor 3 according to the present embodiment, the energy absorbing plate support member 19 has an unillustrated engaging part, the energy absorbing plate operating member 18 has an unillustrated engaged part engaged with the engaging part, and the engaging part and the engaged part can be relatively moved in a circumferential direction by a predetermined angle, thus allowing appropriate movement of the energy absorbing plate support member 19 and the energy absorbing plate operating member 18.

Further, in the seat belt retractor 3 according to the present embodiment, the engaging part has a projection, the engaged part has a cut part in which the projecting is fitted, and the first and second wall parts formed at opposite end portions of the cut part, and the first rotating member 9a and the energy absorbing plate operating member 18 are assembled so as to be relatively rotatable by an angular range within which the projection is moved in the cut part, thus allowing appropriate relative rotation between the first rotating member 9a and the energy absorbing plate operating member 18.

Further, in the seat belt retractor 3 according to the present embodiment, in a case where the projection 9b abuts against the first wall part 18b and where the projection is being moved between the first and second wall parts 18b and 18c, only the first energy absorbing mechanism 15 is actuated, and in a case where the projection 9b abuts against the second wall part 18c, both the first and second energy absorbing mechanisms 15 and 16 are actuated. Thus, a simple and easily-manufactured structure and an appropriate operation can be achieved.

Further, in the seat belt retractor 3 according to the present embodiment, the energy absorbing member 17 is formed of the elongated belt-like energy absorbing plate 17, thus achieving simple structure and easy assembly.

Further, in the seat belt retractor 3 according to the present embodiment, the first energy absorbing mechanism 15 is the torsion bar 15 provided between the spool 9 and the lock mechanism 10, thus achieving a simple structure and easy assembly.

Further, in the seat belt retractor 3 according to the present embodiment, the first rotating member 9a is a tubular part 9a integrally formed with the spool 9 at one end side thereof, thus achieving a simple structure and an appropriate operation.

Further, in the seat belt retractor 3 according to the present embodiment, the energy absorbing plate operating member 18 is relatively rotatably provided in the inner periphery of the tubular part 9a, thus achieving a compact structure.

Further, the seat belt apparatus 1 according to the present embodiment includes at least the seat belt retractor 3 that winds the seat belt 4, the tongue 6 that is slidably supported by the seat belt 4 withdrawn from the seat belt retractor 3, and the buckle 7 with which the tongue 6 is disengageably engaged. Withdrawal of the seat belt 4 is prevented by the seat belt retractor 3 in an emergency to thereby restrain a vehicle occupant with the seat belt 4. Thus, a simple and easily-manufactured structure and an appropriate operation can be achieved.

Further, the seat belt apparatus 1 according to the present embodiment includes a pretensioner that is actuated in an emergency to rotate the spool 9 directly in the seat belt winding direction. Thus, even when the first and second energy absorbing mechanisms 15 and 16 are provided, the pretensioner can demonstrate an effective seat belt winding performance in emergency situations by directly rotating the spool 9 in the seat belt winding direction.

The seat belt retractor according to the present invention is used for a seat belt apparatus installed in a vehicle such as an automobile. The retractor is suitably used as a seat belt retractor that prevents withdrawal of a seat belt while absorbing and alleviating the energy of a vehicle occupant by limiting a load applied to the seat belt in an emergency such as a vehicle collision.

The invention claimed is:

1. A seat belt retractor characterized by comprising:
   a frame;
   a seat belt;
   a spool that is rotatably supported by the frame and winds the seat belt;
   a lock mechanism that allows a rotation of the spool when the seat belt retractor is in a non-operating state and prevents a rotation of the spool in a seat withdrawal direction when the seat belt retractor is in an operating state; and
   an energy absorbing mechanism that absorbs and alleviates the energy of a vehicle occupant by limiting a load applied to the seat belt, wherein
   the energy absorbing mechanism includes:
   a first energy absorbing mechanism that is coaxially incorporated in the spool, the first energy absorbing mechanism having one end portion that is retained by the spool and another end portion that can be locked by the lock mechanism, and obtains a rotational force when being twisted; and
   a second energy absorbing mechanism that includes:
   a first rotating member rotatable together with the spool, the first rotating member has an engaging part;
   an abutting member relatively rotatable with respect to the first rotating member by a predetermined angle, the abutting member has an engaged part engaged with the engaging part, and the engaging part and the engaged part can be relatively moved in a circumferential direction by the predetermined angle;

a second rotating member relatively rotatable with respect to the abutting member; and an energy absorbing member having one end portion that is fixed to and supported by the second rotating member and another end portion that abuts against the abutting member.

2. The seat belt retractor according to claim 1, characterized in that the second rotating member and the abutting member can be relatively rotated by absorbing power of the energy absorbing member.

3. The seat belt retractor according to claim 1, characterized in that the engaging part has a projection, the engaged part has a cut part in which the projecting is fitted, and first and second wall parts formed at opposite end portions of the cut part, and the first rotating member and the abutting member are assembled so as to be relatively rotatable by an angular range within which the projection is moved in the cut part.

4. The seat belt retractor according to claim 3, characterized in that in a case where the projection abuts against the first wall part and where the projection is being moved between the first and second wall parts, only the first energy absorbing mechanism is operated, and in a case where the projection abuts against the second wall part, both the first and second energy absorbing mechanisms are operated.

5. The seat belt retractor according to claim 1, characterized in that the energy absorbing member is formed of an elongated belt-like energy absorbing plate.

6. The seat belt retractor according to claim 1, characterized in that the first energy absorbing mechanism is a torsion bar provided between the spool and the lock mechanism.

7. The seat belt retractor according to claim 1, characterized in that the first rotating member is a tubular part integrally formed with the spool at one end side thereof.

8. The seat belt retractor according to claim 7, characterized in that the abutting member is relatively rotatably provided in the inner periphery of the tubular part.

9. A seat belt apparatus characterized by comprising at least:

the seat belt retractor as claimed in claim 1;

a tongue that is slidably supported by a seat belt withdrawn from the seat belt retractor; and a buckle with which the tongue is disengageably engaged, wherein withdrawal of the seat belt is prevented by the seat belt retractor in an emergency to thereby restrain a vehicle occupant with the seat belt.

10. The seat belt apparatus according to claim 9, characterized by further comprising a pretensioner that is operated in an emergency to rotate the spool directly in a seat belt winding direction.

\* \* \* \* \*